United States Patent [19]

Foster

[11] Patent Number: 5,655,645

[45] Date of Patent: Aug. 12, 1997

[54] SEAL MEMBER FOR RECIPROCATING SLAT CONVEYORS

[76] Inventor: Raymond Keith Foster, P.O. Box 1, Madras, Oreg. 97741

[21] Appl. No.: 722,905

[22] Filed: Sep. 27, 1996

[51] Int. Cl.$^6$ .................................................. B65G 25/04
[52] U.S. Cl. ................................ 198/750.3; 414/525.1
[58] Field of Search ..................... 198/250.3; 414/525.1, 414/525.9

[56] References Cited

U.S. PATENT DOCUMENTS

| Re. 35,022 | 8/1995 | Foster | 198/750 |
|---|---|---|---|
| 4,144,963 | 3/1979 | Hallstrom | 198/750 |
| 4,896,761 | 1/1990 | Foster | 198/750 |
| 4,940,132 | 7/1990 | Foster | 198/750 |
| 4,984,679 | 1/1991 | Foster | 198/750 |
| 5,303,816 | 4/1994 | Foster | 198/750 |

FOREIGN PATENT DOCUMENTS

3731612A1   9/1987   Germany .

*Primary Examiner*—Joseph E. Valenza
*Attorney, Agent, or Firm*—Delbert J. Barnard

[57] ABSTRACT

An elastomeric seal member (94) includes a split, V-shaped upper edge portion including and formed by branches (110, 112) that angle away from each other and toward opposite sides (88, 90) of adjacent conveyor slat (80) of a reciprocating slat conveyor. The seal member (94) includes a base portion (96) that is retained within a longitudinal groove (102) formed in a first side (88) of a first conveyor slat (80). It also includes an outboard portion (98) that is situated within a gap (92) between first and second conveyor slats (80). The inboard and outboard portions (96, 98) are interconnected by a neck (100) that extends through a slot (106). The neck (100) and outboard portion (98) form a dihedral corner (108) where they are joined. This formed corner (108) and contact between neck (100) and a lower slot surface (114) holds and braces the seal member (94) against rotation in the gap (92) in response to downward forces acting on the outboard portion (98) of the seal member (94). The main body of the seal member (94) is made from a relatively soft, resilient elastomeric material. Seal member branch (116) is made from a harder material having a relatively low coefficient of friction.

20 Claims, 4 Drawing Sheets

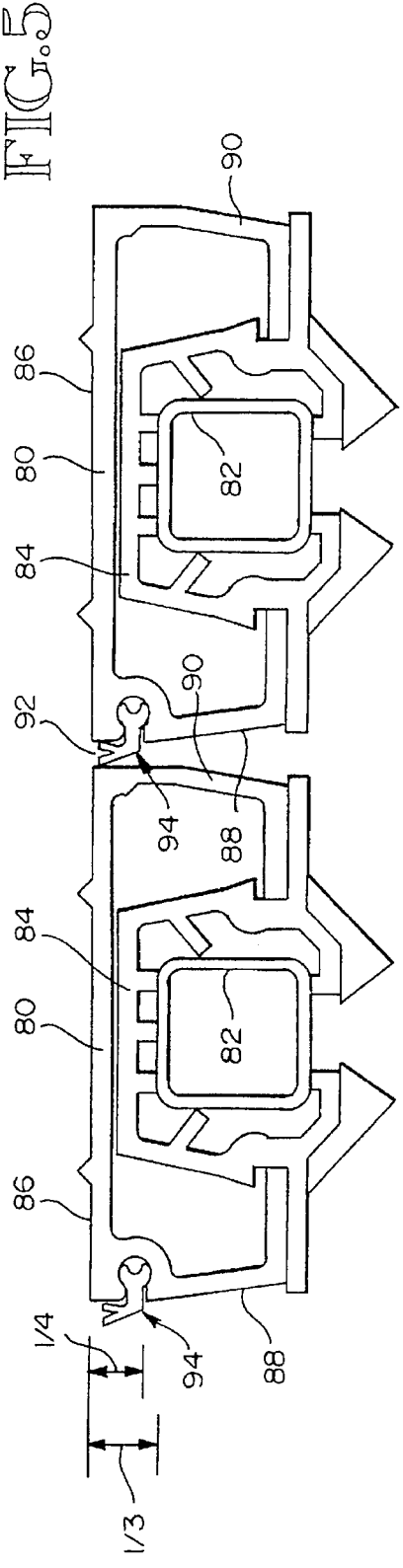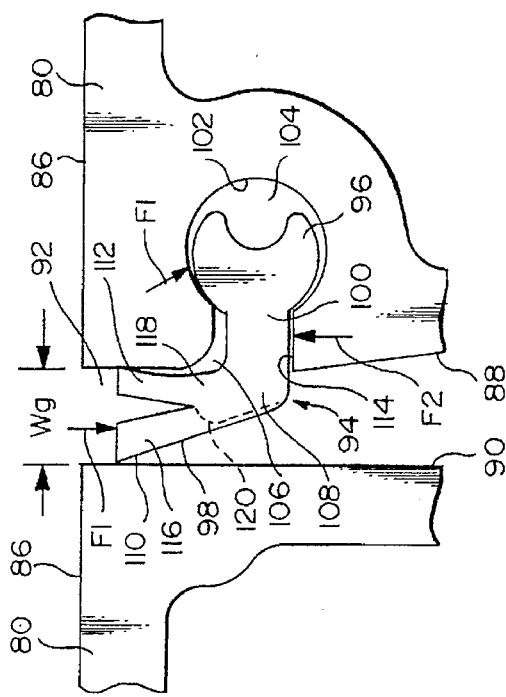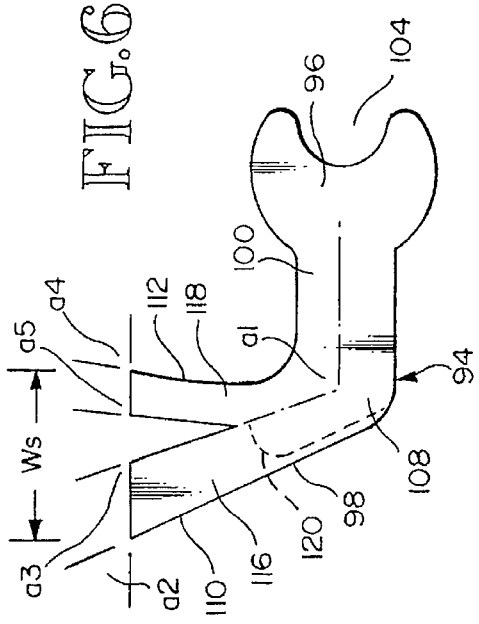

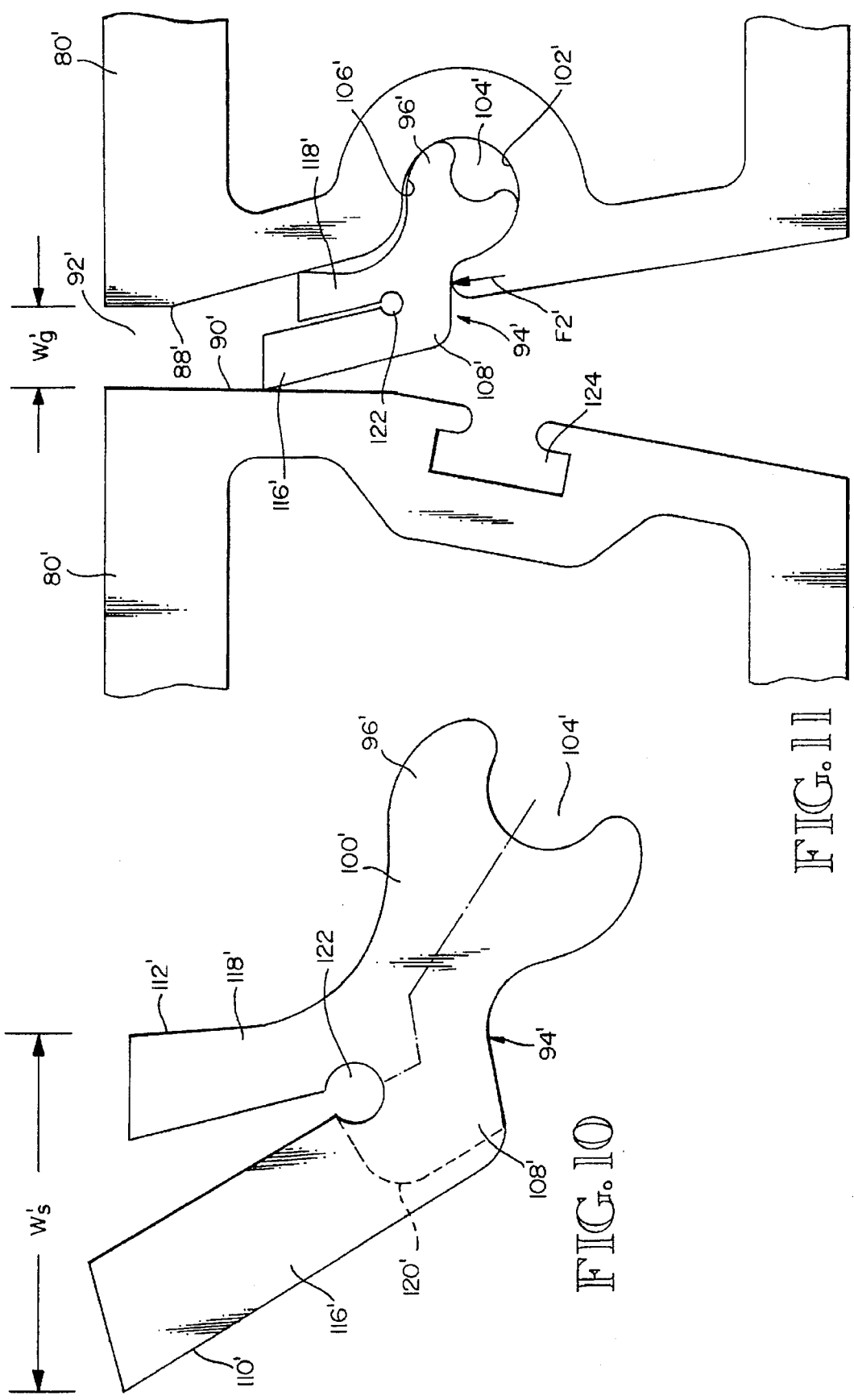

SEAL MEMBER FOR RECIPROCATING SLAT CONVEYORS

TECHNICAL FIELD

This invention relates to elastomeric seal members for sealing gaps between adjacent conveyor slats in reciprocating slat conveyors. More particularly, it relates to the provision of improved seal members and an improved system for holding the seal members in position within the gaps between adjacent conveyor slats.

BACKGROUND OF INVENTION

Example reciprocating slat conveyors, powered by hydraulic drive unit assemblies, are disclosed in my U.S. Pat. No. 4,712,467, granted Dec. 15, 1987; in my U.S. Pat. No. 5,433,312, granted Jul. 18, 1995; and in my U.S. Pat. No. Re 35,022, granted Aug. 22, 1995. In basic concept, reciprocating slat conveyors include a plurality of elongated conveyor slats that are disposed side-by-side across the width of the conveyor. A typical conveyor, for example, is composed of twenty-four conveyor slats divided into three sets and eight groups. Each group is composed of a slat from set one, followed by a slat from set two, followed a slat from set three. This pattern is repeated across the width of the conveyor. Each set of slats is separately powered. The drive mechanism moves all of the slats in unison in the conveying direction and retracts the slats, one set at a time. This is explained in some detail in the above-mentioned patents.

Adjacent conveyor slats define narrow gaps between them in which seal members are provided. Example prior art seal members are disclosed by U.S. Pat. No. 4,144,963, granted Mar. 20, 1979 to Olof A. Hallstrom; by my U.S. Pat. No. 4,896,761, granted Jan. 30, 1990; by my U.S. Pat. No. 4,984,679, granted Jan. 15, 1991; and by my U.S. Pat. No. 5,303,816, granted Apr. 19, 1994. As disclosed in these patents, a seal member is provided in each gap for sealing against debris and other material falling through the gap to the ground or whatever surface may be below the conveyor. In general, the seal members are elastomeric members secured along one floor member at each gap and biased against the adjacent floor member at each gap.

A principal object of the present invention is to provide an improved seal member that is constructed and retained in such a manner that it holds a sealing portion of the sealing member in a stable position within the gap, making the seal member less susceptible to damage-causing distortion in comparison with prior art seal members.

DISCLOSURE OF THE INVENTION

In accordance with the present invention, adjacent conveyor slats form a gap between them. Each gap is bounded by the first side of a first conveyor slat and the second side of a second conveyor slat. The first side of the first conveyor slat includes a longitudinal groove and a slot that opens sideways and outwardly from the groove. The slot is narrower than the groove. The elastomeric seal member of the invention has a base portion within the groove that is wider than the slot. It also includes a narrow neck portion connected to the base portion. The neck portion extends outwardly from the base portion through the slot. The seal member further includes an outboard portion connected to the neck portion outwardly of the slot. The neck portion and the outboard portion of the seal member form a dihedral corner section where they are joined. The outboard portion extends upwardly from the corner section and has a split upper part that is within the gap. The split upper part includes a first branch that angles towards and contacts the second side of the second conveyor slat and a second branch that angles towards and contacts the first side of the first conveyor slat. The split upper part has a relaxed width dimension that is wider than the gap width. As a result, the split upper part of the outboard portion of the seal member must be compressed in order to position it within the gap. This compression moves the branches of the split upper part of the outboard portion of the seal member relatively towards each other. The branches are resilient and this resiliency biases the first branch against the second side of the second conveyor slat and the second branch against the first side of the first conveyor slat.

In preferred form, the slot in the first conveyor slat has an upwardly directed lower surface that is contiguous a lower surface of the neck portion of the seal member. As a result, downward forces imposed on the outboard portion of the seal member will move the neck portion of the seal member into contact with the lower surface of the slot. This contact braces the seal member against downward rotation.

In preferred form, the second branch of the split upper part of the outboard portion of the seal member is relatively hard and has a relatively low coefficient of friction at least where it contacts the second side of the second conveyor slat. The seal member may be made from a polyurethane material with an ether base. The second branch of the split upper part of the outboard portion of the seal member may further include molybdenum disulfide, at least where it contacts the second side of the second conveyor slat. The molybdenum disulfide makes the second branch relatively hard and provides it with low friction surface.

The corner section stiffens the outboard portion of the seal member against downward rotation into the gap. The contact between the lower surface of the neck portion of the seal member and the upwardly directed lower surface of the slot braces the seal member against downward rotation into the gap. As a result, the split upper part of the outboard portion of the seal member is vertically stabilized in the gap. Downward forces acting on the outboard portion of the seal member will help spread the branches of the split upper part and help bias them into sealing contact with the conveyor slat surfaces that form the gap. However, downward displacement or rotation of the outboard portion of the seal member is resisted.

Other features and advantages of the present invention can be seen and understood by examination of the appended drawings, the description of the best mode for carrying out the invention, and the appended claims, all of which are incorporated herein by reference as a part of the disclosure of the present invention.

BRIEF DESCRIPTION OF THE DRAWINGS

Like reference numerals are used to designate like parts throughout the several views of the drawing, and:

FIG. 5 is a cross-sectional view taken through a pair of adjacent conveyor slats, showing a seal member and seal member retaining system constructed according to the present invention;

FIG. 6 is an enlarged scale and elevational view of the seal member shown in FIG. 5;

FIG. 7 is an enlarged scale, fragmentary view of the upper gap region between adjacent conveyor slats, showing the in-use position and condition of the seal member shown by FIGS. 5 and 6;

FIG. 10 is an enlarged scale and elevational view of a modified seal member; and FIG. 11 is an enlarged scale, fragmentary cross-sectional view of adjoining portions of adjacent conveyor slots showing the seal member of FIG. 10.

DESCRIPTION OF ILLUSTRATED PRIOR ART

Figure 1:
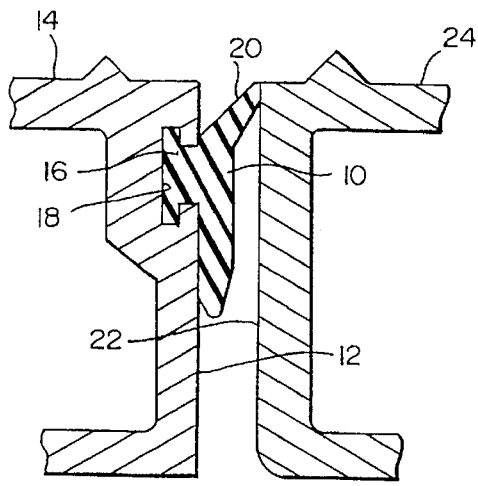
FIG. 1 is a fragmentary cross-sectional view taken through adjoining portions of adjacent conveyor slats, showing an elastomeric seal member in a gap between the two conveyor slats, secured to one of the conveyor slats and in sliding engagement with a side of the other conveyor slat, such view showing a first prior art seal member.

FIG. 1 illustrates the seal member and seal member retaining system that is disclosed in the aforementioned U.S. Pat. No. 4,144,963. The seal member 10 is removably secured to the first side 12 of a first conveyor slat 14. Seal member 10 has a dove-tail base portion 16 that is removably received within a matching dove-tail groove 18 formed in the first side 12 of the first conveyor slat 14. The seal member 10 includes an upper portion 20 that extends at an angle upwardly and outwardly from the base portion 16, into sliding contact with a confronting side 22 of an adjacent second conveyor slat 24. The weight of the material being conveyed acts to force the upper portion 20 of the seal member 10 into positive, sliding engagement with the side surface 22.

Figure 2:
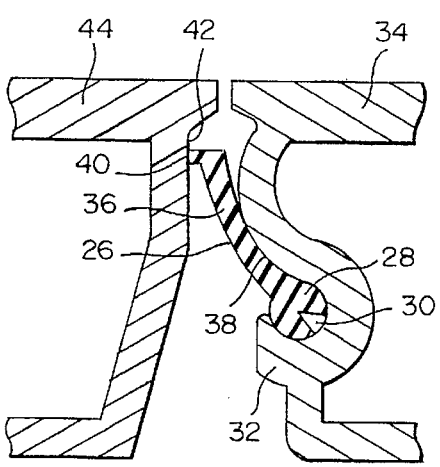
FIG. 2 is a view like FIG. 1, but showing a second prior art seal member.

The seal assembly shown by FIG. 2 is disclosed in detail in my aforementioned U.S. Pat. No. 4,896,761. In this assembly, the seal member 26 has a base portion 28 that is generally circular in cross-section. It is received within a circular groove 30 formed in a sidewall 32 of a first conveyor slat 34. Seal member 26 includes a flexible, substantially flat outboard portion 36 that bends around a convex sidewall 38 on conveyor slat 34. Outboard portion 36 of seal member 26 includes a lip 40 that is biased by the bending into sealing contact with side surface 42 of conveyor slat 44.

Figure 3:
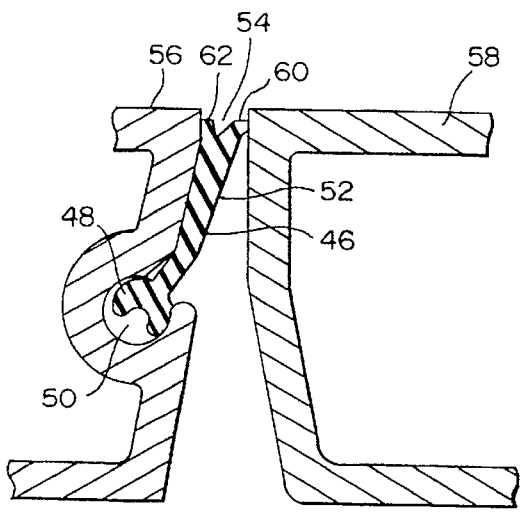
FIG. 3 is a view like FIG. 1 and 2, but showing a third prior art seal member.

The seal assembly shown by FIG. 3 is disclosed in detail in my aforementioned U.S. Pat. No. 5,303,816. In this seal assembly, the seal member 46 includes an inboard base portion 48 that is received within a longitudinal groove 50. Seal member 46 includes an outboard portion 52 that extends upwardly from the groove 50 into a gap region 54 formed between the two conveyor slats 56, 58. The upper edge portion of the seal member 46 is split into two branches 60, 62. The branched region of the seal member 46 has a relaxed width that is larger than the width of gap 54. This causes the branches 60, 62 to bend toward each other when the seal member 46 is positioned within the gap. The branches must move together in order to fit within the gap 54. This bending of the branches 60, 62 stores energy in them which serves to bias the branches 60, 62 into contact with the side surfaces of the conveyor slats 56, 58. Branch 60 is biased into contact with the side surface of conveyor slat 58. Branch 62 is biased into contact with the side surface of conveyor slat 56.

Figure 4:
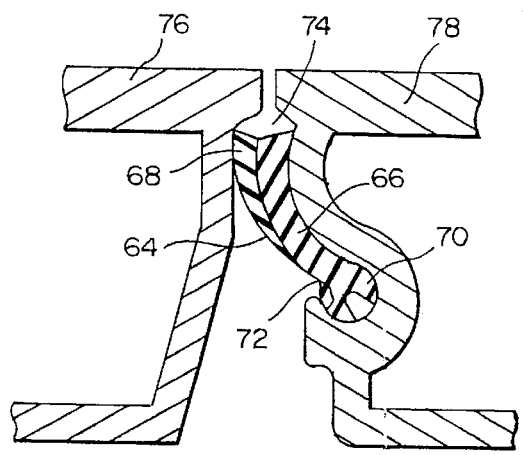
FIG. 4 is a view of FIG. 1–3, but showing a fourth prior art seal member.
Figure 8:
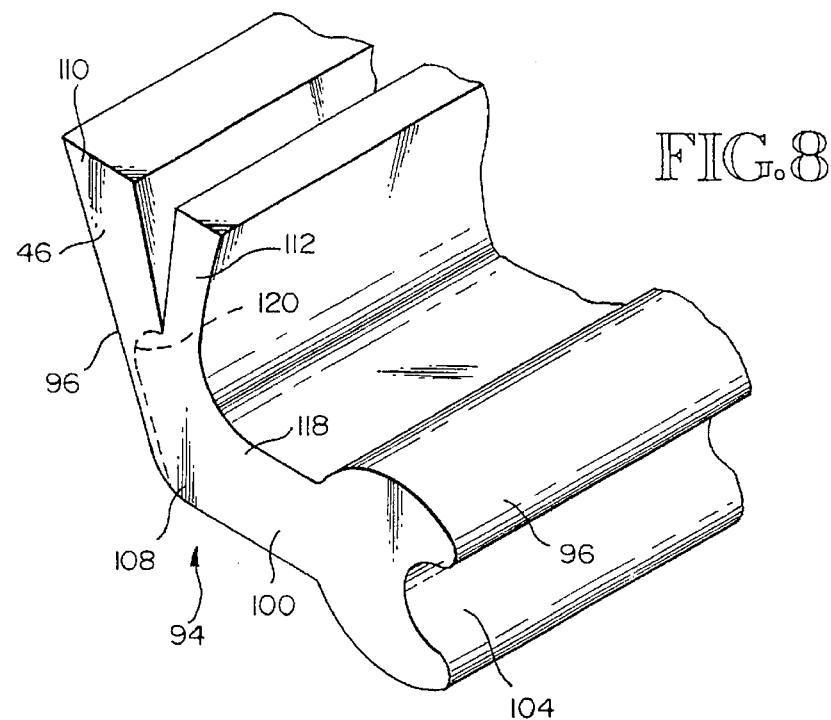
FIG. 8 is a fragmentary pictorial view of the seal member shown in FIGS. 5–7.
Figure 9:
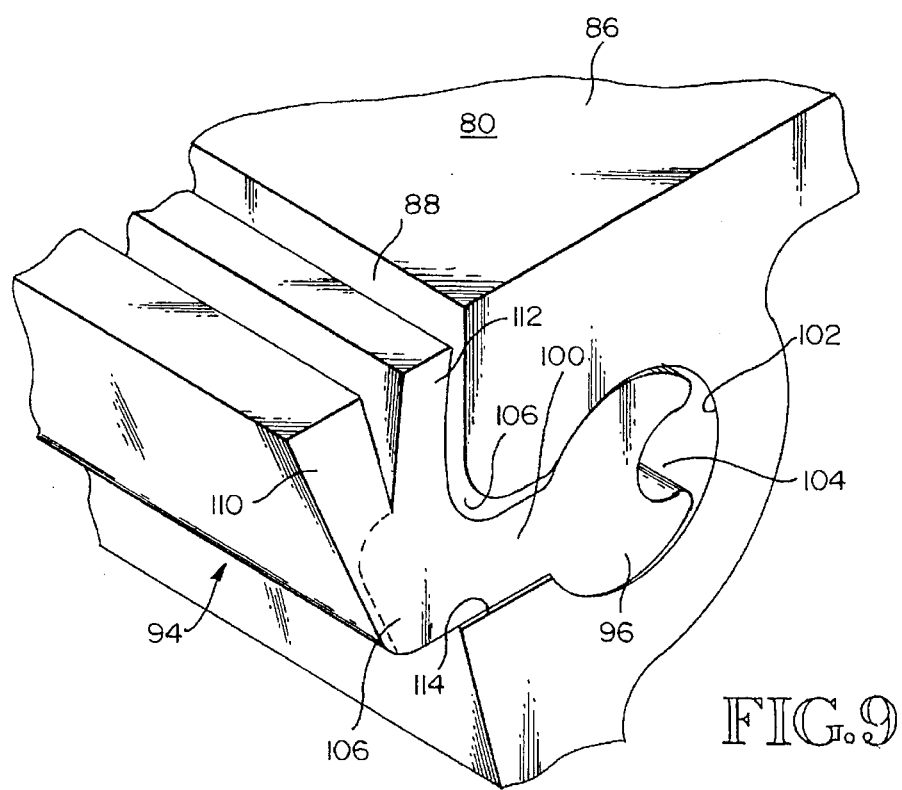
FIG. 9 is a fragmentary pictorial view of the seal member of FIGS. 5–8 attached to a conveyor slat.

The seal assembly shown by FIG. 4 is disclosed in detail in my aforementioned U.S. Pat. No. 4,984,679. In this seal assembly, the seal member 64 has a relatively resilient body portion 66 and a harder second portion 68 having low friction characteristics. Seal member 64 has an inboard base portion 70 that is received within an elongated groove 72. Seal member 64 also has an outboard portion that fits in the gap region 74 formed to be wider than the gap region 74. When the upper portion part of the outboard of the seal member 64 is positioned within the gap region 74, the more resilient body portion of the seal member 64 compresses. It biases the seal member harder region 68 into engagement with the side surface of conveyor slat 76.

BEST MODE FOR CARRYING OUT THE INVENTION

FIG. 5 shows two identical floor slats 80 positioned side-by-side. A typical conveyor may comprise twenty-four such conveyor slats, positioned side-by-side across the full width of the conveyor. A twenty-four slat conveyor is shown in my U.S. Pat. No. 4,474,285, granted Oct. 2, 1984. By way of example, the slats may measure from forty to fifty feet in length.

In the FIG. 5 embodiment, each conveyor slat 80 is supported on and guided by an elongated tubular guide beam 82. A plurality of plastic bearings 84 are positioned on each guide beam 82. The bearings 84 and guide beams 82 are described in some detail in my U.S. Pat. No. 4,858,748, granted Aug. 22, 1989, the contents of which are hereby incorporated herein by this reference.

For discussion purposes, each adjacent pair of conveyor slats 80 will be referred to as a first slat 80 and a second slat 80. In FIGS. 5 and 7, the conveyor slat on the right is the first conveyor slat 80. The conveyor slat on the left is the second conveyor slat 80. Each conveyor slat 80 includes a top 86, a first side 88 and a second side 90. A gap 92 is formed by and between each pair of sides 88, 90. The cross sectional configuration of each conveyor slat 80 is constant throughout the whole length of the slat. The gap width Wg is somewhat constant throughout the full length of the conveyor.

Referring to FIG. 6 in particular, the seal member 94 of the present invention has a unique shape and construction. Each seal member 94 has a substantially constant cross sectional shape throughout its length. It includes an inboard base portion 96, a branched outboard portion 98, and an interconnecting neck portion 100. Base portion 96 is basically like the base portions of the prior art seals shown by FIGS. 2–4. It is generally circular in cross-section and is sized to fit within a groove 102 formed in the first side 88 of its conveyor slat 80. Grooves 102 are also substantially circular in cross-section. A relief groove 104 is provided in base portion 96. The provision of relief groove 104 makes the base portion 96 relatively compressible for ease of its assembly into the retaining groove 102. The base portion 96 of seal member 94 is longitudinally slid into the retaining groove 102. Because the floor members 80 and the seal members 94 may be forty feet or more in length, a significant amount of friction would be encountered if the base portion 96 were not made to be slightly compressible.

According to an aspect of the invention, a slot 106 opens generally sideways outwardly from the groove 102. In FIGS. 5 and 7, the slot 106 is shown to extend substantially horizontally. However, it can angle upwardly or downwardly somewhat and still be considered to open generally sideways outwardly from the groove 102. As shown in FIG.

7, the base portion 96 of seal member 94 is wider than the slot 106. Even though base portion 96 is compressible, due to the presence of the relief groove 104, it cannot be compressed to such an extend it will readily fit through the slot 106. As a result, when the seal member 94 is installed, with its base portion 96 within a groove 102, the seal member 94 is connected to its conveyor slat 80. It is not movable laterally away from such conveyor slat 80.

The outboard portion 96 and the neck portion 100 form a dihedral corner section 108 where they join. In the illustrated embodiment, the interior angle a1 (FIG. 6) measures about one hundred and seventeen degrees (117°). Referring to FIG. 6 and 7, the outboard portion 98 of seal member 94 extends upwardly from the corner section 108 and at its upper end splits into two diverging branches 110, 112. In the illustrated embodiment, the outside surface of branch 110 may extend at an angle a2 of about sixty-three degrees (63°) to horizontal. The inside surface of branch 110 may extend at an angle of about seventy-one degrees (71°) to horizontal the outside surface of branch 112 may extend at an angle a4 of about eighty-one degrees (81°). The inside surface of branch 112 may extend at an angle a5 of about eighty-seven degrees (87°) to horizontal. Thus, the branches 110, 12 widen somewhat as they extend upwardly from where they are joined.

The split upper part 110, 112 of the outboard portion 98 of seal member 94 has a static or relaxed width dimension Ws which in a typical installation may measure about 0.170 inches. This width Ws is larger than the gap width Wg that will be encountered in the installation of which seal member 94 is a part. As a result, it is necessary for the branch portion 110, 112 of the seal member 94 to be compressed in order for it to fit within a gap 92. Preferably, the conveyor slats 80 are installed in the manner illustrated and described in my aforementioned U.S. Pat. Nos. 4,896,761 and 5,303,816, for example. Referring to FIG. 5, the conveyor slat 80 on the left would be installed before the conveyor slat on the right. Following installation of the conveyor slat 80 on the left, the conveyor slat 80 on the right is set down onto the bearings 84 on its support beam 82. Initially, the conveyor slat 80 on the right will be elevated above the installed conveyor slat 80 on the left. Its seal member 94 will be positioned vertically above where the gap 92 will eventually be formed. Then, the conveyor slat 80 on the right is pushed vertically downwardly to snap it into an installed position on its bearings 84. This downward movement of the conveyor slat 80 will move the seal member 94 downwardly into the slot 92 at substantially the same time that the slot 92 is formed. Seal member branch 112 will contact surface 88 on the first conveyor slat 80. Seal member branch 110 will contact surface 90 on the second conveyor slat 80. As downward movement progresses, the seal member branches 110, 112 are moved by contact relatively together as the outboard portion 98 of the seal member 94 moves into the gap 92. In order to enter the gap 92, the seal member branches 110, 112 must bend relatively together away from their natural or static positions. This bending of the branches 110, 112 stores energy into the branches 110, 10 and this stored energy serves to bias branch 110 against conveyor slat surface 90 and branch 112 against conveyor slat surface 88.

During use, any downward force F1 applied on the split upper part 110, 112 of the outboard portion 98 of seal member 94 will help bias the seal member branches 110, 112 into sealing contact with the surfaces 90, 88. Downward forces imposed on the outboard portion 98 of seal member 94 will want to move the outboard portion 98 downwardly into the gap. The presence of the dihedral corner 108 causes the seal member 94 to want to retain its shape. The corner region 108 is stiff enough that downward forces acting on outboard portion 98 will not rotate the outboard portion 98 to such an extent that it becomes folded downwardly into the gap. This is something that can happen with the prior art seals shown by FIGS. 2–4 which do not include a formed corner region. Downward forces acting on the outboard portion 98 of seal member 94 will rotate the seal member 94 to a limited extent, viz., until the neck portion 100 of the seal member 94 makes contact with the upwardly directed lower surface of the slot 106.

In FIG. 7, a downward force imposed on outboard portion 98 of seal member 94 is indicated by a force arrow F1. A second force arrow F2 shows a reaction force that is imposed by the upwardly directed lower surface of slot 106 against neck 100 of seal member 94. Some contact of the inboard portion 96 of seal member 94 with an inner surface of groove 102 will be expected in the region indicated by the force arrow F3. Accordingly, the stiffness and shape provided to the seal member 94 by the corner region 108, and the contact of the neck 100 of seal member 94 with slot surface 114, will act together to stabilize the outboard portion 98 of the seal member 94 within the gap 92. It will be stabilized against a rotation or folding of the outboard portion 98 downwardly into the gap 92.

The seal member 94 is formed by extrusion and it is preferably constructed from a polyurethane material although it is believed that other plastic materials such as Teflon™, Delrin™, Nylon™ and polyethylene could also be used. Some of these materials can be formulated so as to be substantially self-lubricating.

It is preferred that the seal member 94 be extruded from a polyurethane material with an ether base. It is also preferred that the surface region of branch 110 that is in contact with conveyor slat surface 90 be constructed from a material that is relatively hard and has a relatively low coefficient of friction and that the remainder of the seal member 94 is constructed from a more resilient material. As explained in my aforementioned U.S. Pat. No. 4,984,679, providing the seal member 94 with a resilient outboard portion 98 permits the seal member outboard portion 98 to conform to the gap width Wg. This conformance happens initially when the seal member 94 is moved into the gap 92, and it continues throughout operation of the conveyor. In some installations, the conveyor slats move laterally together and apart because of relative lateral movement of the conveyor slat supports. This is because the conveyor slat supports are, in many cases, carried by a vehicle and the vehicle frame twists and moves during movement of the vehicle. This relative movement of frame portions of the vehicle is transferred to the support frames for the conveyor slat members and thus to the conveyor slats themselves. Untrue longitudinal surfaces also result in gap width changes during reciprocation. The seal member of the present invention permits such movement to be accommodated while, at the same time, maintaining a filler body within the gap 92 which blocks movement of small particles into and through the gap 92, into the region below the seal member 94.

In accordance with an aspect of the present invention, the part 116 of the outboard portion 98 of seal member 94 is formed from a plastic material that is relatively hard while, at the same time, having a relatively low coefficient of friction. The remaining part 118 of the seal member 94 is formed from a softer, more resilient or more compressible material. The boundary between the two regions of the seal member 94 is designated 120 in FIGS. 6 and 7. It is shown in the form of a broken line 120. The relatively hard region 116 is preferably composed of all of branch 110 and an outer surface portion of the corner region 108 immediately below branch 110. The relative hardness of region 116 allows such region 116 to assume a substantial amount of wear at the surface where relative movement occurs. The remaining region 118 of the seal member 94 provides a cushioned backing for the first region 116. A softer more resilient material can be used in seal member region 118 because there is no sliding movement between seal member region 118 and conveyor slat surface 80.

The seal member 94 of the present invention is a resiliently-cushioned, hard face seal. The resilient cushion or backing maintains sliding contact between region 116 and the second side surface 90 of the second conveyor slat 80 of each adjacent pair of conveyor slats 80. The thickness of the outboard portion 98 of seal member 94 changes in response to changes in the gap width Wg, while at the same time maintaining a force on branch 110, continuously urging region 116 into sliding contact with the surface 90 of the adjacent conveyor slat 80.

At the left end of FIG. 5 a first distance is labeled one-fourth and a second distance is labeled one-third. These distances represent one-fourth and one-third of the total height dimension of the conveyor slat 80. An aspect of the present invention involves a movement of the groove 102 upwardly from its position in the prior art conveyor shown by FIGS. 2–4. It is located within the upper third of the conveyor slat height and is very close to being located in the upper one-fourth of the conveyor slat height. The raising of the seal member 92 functions to reduce the vertical height of its outboard portion 98. This reduction in vertical dimension plus a widening of the region below the branches 116, 118 that joins with the neck 100 to form the corner 108, further helps to stabilize the outboard portion 94 of the seal member 94 within the gap 92.

The seal member 94 of the present invention is both similar to and distinct from the seal member shown in FIG. 4 and in my aforementioned U.S. Pat. No. 4,984,679. The two seal members are similar in that they are both constructed to include a relatively hard region where sliding contact occurs between the seal member and a side surface of the adjacent conveyor slat while otherwise being constructed from a softer, more resilient material. They are different, in that the seal member 94 of this invention is preformed to include a relatively stiff dihedral corner region, and includes a neck portion 100 that is moved by downward forces against a bracing surface 114, and has a split or branched upper part of the outboard portion 98. The outboard portion 98 of seal member 94 is compressible within the gap 92 for two reasons. Firstly, the material itself is compressible. Secondly, the branches 110, 112 are bendable, allowing them to bend or deflect like beams. This bending of both branches 110, 112, plus the compression of at least branch 112, allows the seal member to maintain sealing contact while accommodating itself to the changing gap width Wg. The formed dihedral corner 108 and the bracing contact occurring between neck 100 and surface 114, prevent a downward rotation or folding of the outboard portion 98 into the gap 92. This is a distinct improvement over the prior art seals.

The two part seal member 94 may be manufactured by a co-extrusion process. This process is a known process and to some extent is described in my aforementioned U.S. Pat. No. 4,984,679. A first material, e.g. a polyurethane material with an ether base, is delivered to a first inlet of a co-extrusion die. A second material, e.g. a polyurethane material with an ether base to which molybdenum disulfide has been added, is delivered into a second inlet of the same die. The first material forms the main body portion or section 118 of seal member 94. The second material forms the harder region 116, having a relatively low coefficient of friction. Co-extrusion technology is known and, for that reason, the details of the equipment and process used need not be disclosed and are not disclosed. The first material goes through a die opening that forms it into the seal member region 118. The second material goes through a die opening which forms it into the remaining portion 116 of the seal member 94. These two portions of the seal members 94 are then joined, while hot, in a downstream portion of the die, to complete extrusion of the seal member 94. The seal member 94 which emerges from the die is of a one-piece construction, with the two regions 116, 118 being so firmly bonded to each other that the resulting seal member can be considered to be a one-piece structure even though a portion of it is relatively hard and a second portion of it relatively more resilient.

The division of the seal member 94 into the two parts or portions can occur at a different location than is indicated by the boundary line 120. However, what is important is that the harder portion be the portion that is in contact with the relatively moving surface of the adjacent conveyor slat and that such surface be urged into sealing contact with the conveyor slat surface by the more resilient portion. Although a split or branched upper part of the outboard portion of the seal member is preferred, it is also within the scope of the invention for the branches 110, 112 to be joined, rather than separated, such as disclosed in my U.S. Pat. No. 4,984,679.

FIGS. 10 and 11 show a modified embodiment of the seal member 94' of the present invention. By way of typical and therefore nonlimitive example, this seal member 94' is dimensioned to be a retrofit seal member for use in the conveyor slat assembly that is disclosed in my U.S. Pat. No. 4,940,132, granted to me on Jul. 10, 1990. The conveyor slat in that patent included a T-slot 124 for the reception of a second seal provided to seal against road spray and splashing from below the conveyor. A difference between seal member 94' and seal member 94 is that the neck 100' and the slot 106' angle upwardly as they extend out from the groove 104'. The corner 108' continues to add a definite form to the seal member 94' and there is contact by the lower surface of the slot 106' with the lower surface of the corner 94' that provides bracing at the location of force F2'. A second difference is that branch 112' is shorter than 110'. A third difference is that a longitudinal groove 122 is provided at the bases of the branches 110', 112' where they meet. This groove 122 decreases the thicknesses of the branches 10', 112' at their bases, making them more flexible than they are in the embodiment of FIGS. 5–9, in a seal member 94' where everything else is unchanged.

FIG. 11 shows a gap Wg' between adjacent conveyor slats 80'. This gap 92' has a width Wg'. As in the earlier embodiment, seal member branch 116' makes contact with conveyor slat surface 90'. Seal member branch 118' makes contact with surface 88' of the other conveyor slat 80'.

It is to be understood that the disclosed embodiments are submitted for the purpose of providing examples of the invention. The scope of protection is not to be limited by the details of these embodiments, but rather only by the following claims, interpreted by the established rules of patent claim interpretation, including use of the doctrine of equivalents.

I claim:

1. A reciprocating slat conveyor comprising:

elongated, side-by-side, first and second conveyor slats, each having a top and first and second opposite sides, said conveyor slats forming a gap between them, said gap being bounded by the first side of the first conveyor slat and the second side of the second conveyor slat;

said first side of said first conveyor slat including a longitudinal groove and a slot opening sideways outwardly from the groove, said slot being narrower than the groove;

an elongated, elastomeric seal member in the gap, said seal member having a base portion within said groove that is wider than the slot, a narrow neck portion connected to the base portion and extending outwardly from the base portion through said slot, and an outboard portion connected to said neck portion outwardly of the slot, said neck portion and said outboard portion forming a dihedral corner section where they are joined, said outboard portion extending upwardly from the corner section and having a split upper part that is within said gap, said split upper part including a first branch angled towards and contacting the second side of the second conveyor slat and a second branch angled towards and contacting the first side of the first conveyor slat; and said gap being sufficiently narrow to cause the first and second branches of the split upper part of the outboard portion of the seal member to be deflected towards each other, said branches having resiliency that biases the first branch against the second side of the second conveyor slat and the second branch against the first side of the first conveyor slat.

2. A reciprocating slat conveyor according to claim 1, wherein said slot in the first conveyor slat has an upwardly directed lower surface that is contiguous a lower surface of the neck portion of the seal member, whereby downward forces imposed on the outboard portion of the seal member will move the neck portion of the seal member into contact with the lower surface of the slot, such contact bracing the outboard portion of the seal member against downward rotation.

3. A reciprocating slat conveyor according to claim 2, wherein the second branch of the split upper part of the outboard portion of the seal member is relatively hard and has a relatively low coefficient of friction, at least where it contacts the second side of the second conveyor slat.

4. A reciprocating slat conveyor according to claim 3, wherein the seal member is made from a polyurethane material with an ether base, and the second branch of the split upper part of the outboard portion of the seal member, further includes molybdenum disulfide, at least where it contacts the second side of the second conveyor slat.

5. A reciprocating slat conveyor according to claim 1, wherein the second branch of the split upper part of the outboard portion of the seal member is relatively hard and has a relatively low coefficient of friction, at least where it contacts the second side of the second conveyor slat.

6. A reciprocating slat conveyor according to claim 5, wherein the seal member is made from a polyurethane material with an ether base, and the second branch of the split upper part of the outboard portion of the seal member, further includes molybdenum disulfide, at least where it contacts the second side of the second conveyor slat.

7. A reciprocating slat conveyor according to claim 1, wherein the groove in the first side of the first conveyor slat is in the upper one-third of the conveyor slat.

8. A reciprocating slat conveyor according to claim 7, wherein said slot in the first conveyor slat has an upwardly directed lower surface that is contiguous a lower surface of the neck portion of the seal member, whereby downward forces imposed on the outboard portion of the seal member will move the neck portion of the seal member into contact with the lower surface of the slot, such contact bracing the outboard portion of the seal member against downward rotation.

9. A reciprocating slat conveyor according to claim 8, wherein the second branch of the split upper part of the outboard portion of the seal member is relatively hard and has a relatively low coefficient of friction, at least where it contacts the second side of the second conveyor slat.

10. A reciprocating slat conveyor according to claim 9, wherein the seal member is made from a polyurethane material with an ether base, and the second branch of the split upper part of the outboard portion of the seal member, further includes molybdenum disulfide, at least where it contacts the second side of the second conveyor slat.

11. A reciprocating slat conveyor comprising:

elongated, side-by-side, first and second conveyor slats, each having a top and first and second opposite sides, said conveyor slats forming a gap between them, said gap being bounded by the first side of the first conveyor slat and the second side of the second conveyor slat;

said first side of said first conveyor slat including a longitudinal groove and a slot opening sideways outwardly from the groove, said slot being narrower than the groove;

an elongated, elastomeric seal member in the gap, said seal member having a base portion within said groove that is wider than the slot, a narrow neck portion connected to the base portion and extending outwardly from the base portion through said slot, and an outboard portion connected to said neck portion outwardly of the slot, said neck portion and said outboard portion forming a dihedral corner section where they are joined, said outboard portion extending upwardly from the corner section and having an upper part that is within said gap, said upper part including a first side surface angled contacting the second side of the second conveyor slat and a second side surface and contacting the first side of the first conveyor slat; and said gap being sufficiently narrow to cause the upper part of the outboard portion of the seal member to be compressed in the gap, said upper portion having resiliency that biases the first surface against the second side of the second conveyor slat and the second surface against the first side of the first conveyor slat.

12. A reciprocating slat conveyor according to claim 11, wherein said slot in the first conveyor slat has an upwardly directed lower surface that is contiguous a lower surface of the neck portion of the seal member, whereby downward forces imposed on the outboard portion of the seal member will move the neck portion of the seal member into contact with the lower surface of the slot, such contact bracing the outboard portion of the seal member against downward rotation.

13. A reciprocating slat conveyor according to claim 2, wherein the first surface of the upper part of the outboard portion of the seal member is relatively hard and has a relatively low coefficient of friction, at least where it contacts the second side of the second conveyor slat.

14. A reciprocating slat conveyor according to claim 3, wherein the seal member is made from a polyurethane material with an ether base, and the first surface of the upper part of the outboard portion of the seal member, further includes molybdenum disulfide, at least where it contacts the second side of the second conveyor slat.

15. A reciprocating slat conveyor according to claim 1, wherein the first surface of the upper part of the outboard portion of the seal member is relatively hard and has a relatively low coefficient of friction, at least where it contacts the second side of the second conveyor slat.

16. A reciprocating slat conveyor according to claim 5, wherein the seal member is made from a polyurethane material with an ether base, and the first surface of the upper part of the outboard portion of the seal member, further includes molybdenum disulfide, at least where it contacts the second side of the second conveyor slat.

17. A reciprocating slat conveyor according to claim 1, wherein the groove in the first side of the first conveyor slat is in the upper one-third of the conveyor slat.

18. A reciprocating slat conveyor according to claim 7, wherein said slot in the first conveyor slat has an upwardly directed lower surface that is contiguous a lower surface of the neck portion of the seal member, whereby downward forces imposed on the outboard portion of the seal member will move the neck portion of the seal member into contact with the lower surface of the slot, such contact bracing the outboard portion of the seal member against downward rotation.

19. A reciprocating slat conveyor according to claim 8, wherein the first surface of the upper part of the outboard portion of the seal member is relatively hard and has a relatively low coefficient of friction, at least where it contacts the second side of the second conveyor slat.

20. A reciprocating slat conveyor according to claim 9, wherein the seal member is made from a polyurethane material with an ether base, and the first surface of the upper part of the outboard portion of the seal member, further includes molybdenum disulfide, at least where it contacts the second side of the second conveyor slat.

* * * * *